United States Patent
Kim et al.

(10) Patent No.: US 10,779,306 B2
(45) Date of Patent: Sep. 15, 2020

(54) METHOD FOR SIGNAL TRANSMISSION IN WIRELESS COMMUNICATION SYSTEM AND DEVICE THEREFOR

(71) Applicant: LG Electronics Inc., Seoul (KR)

(72) Inventors: Youngtae Kim, Seoul (KR); Seungmin Lee, Seoul (KR); Kijun Kim, Seoul (KR); Inkwon Seo, Seoul (KR); Hyunsoo Ko, Seoul (KR); Jonghyun Park, Seoul (KR); Daesung Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/324,821

(22) PCT Filed: Aug. 11, 2017

(86) PCT No.: PCT/KR2017/008768
§ 371 (c)(1),
(2) Date: Feb. 11, 2019

(87) PCT Pub. No.: WO2018/030851
PCT Pub. Date: Feb. 15, 2018

(65) Prior Publication Data
US 2019/0230680 A1    Jul. 25, 2019

Related U.S. Application Data

(60) Provisional application No. 62/373,994, filed on Aug. 12, 2016.

(51) Int. Cl.
*H04W 72/12* (2009.01)
*H04B 7/0413* (2017.01)
*H04W 72/04* (2009.01)

(52) U.S. Cl.
CPC ...... *H04W 72/1231* (2013.01); *H04B 7/0413* (2013.01); *H04W 72/04* (2013.01);
(Continued)

(58) Field of Classification Search
CPC .................................................. H04B 7/0413; H04W 72/04; H04W 72/0413; H04W 72/0446; H04W 72/12; H04W 72/1231; H04W 72/1284
See application file for complete search history.

(56) References Cited

U.S. PATENT DOCUMENTS

| | | |
|---|---|---|
| 2011/0164668 A1 | 7/2011 | Hoek et al. |
| 2013/0215844 A1 | 8/2013 | Seol et al. |

(Continued)

FOREIGN PATENT DOCUMENTS

| | | |
|---|---|---|
| CN | 104734759 A | 6/2015 |
| EP | 3261269 A1 | 12/2017 |

(Continued)

*Primary Examiner* — Saad A. Waqas
(74) *Attorney, Agent, or Firm* — Dentons US LLP (57) ABSTRACT

The present invention relates to a method by which a terminal transmits a signal in a wireless communication system supporting multiple-input multiple-output (MIMO), and to a device. Particularly, the method comprises the steps of: transmitting a scheduling request to a base station by using a scheduling request beam resource, and receiving, from the base station, a confirm message corresponding to the scheduling request, wherein the confirm message includes an indication determined according to the scheduling request beam resource and the best downlink beam preset to a terminal.

10 Claims, 5 Drawing Sheets

(52) U.S. Cl.
CPC ... *H04W 72/0413* (2013.01); *H04W 72/0446* (2013.01); *H04W 72/12* (2013.01); *H04W 72/1284* (2013.01)

(56) References Cited

U.S. PATENT DOCUMENTS

| | | | |
|---|---|---|---|
| 2015/0049824 A1* | 2/2015 | Kim | H04B 7/0456 375/267 |
| 2016/0056871 A1 | 2/2016 | Kakishima et al. | |
| 2016/0219619 A1* | 7/2016 | Guo | H04L 5/0035 |
| 2017/0033851 A1 | 2/2017 | Zhong et al. | |
| 2017/0318541 A1* | 11/2017 | Islam | H04W 52/146 |
| 2019/0199412 A1* | 6/2019 | Koskela | H04B 7/063 |

FOREIGN PATENT DOCUMENTS

| | | |
|---|---|---|
| KR | 1020130030225 A | 3/2013 |
| KR | 1020140002569 A | 1/2014 |
| KR | 1020140004513 A | 1/2014 |
| WO | 2016086144 A1 | 6/2016 |

\* cited by examiner

(a) Control plane protocol stack (b) User plane protocol stack

METHOD FOR SIGNAL TRANSMISSION IN WIRELESS COMMUNICATION SYSTEM AND DEVICE THEREFOR

This application is a 35 usc § 371 national stage entry of international application no. PCT/KR2017/008768 filed on Aug. 11, 2017, and claims priority to U.S. provisional application No. 62/373,994 filed on Aug. 12, 2016, all of which are hereby incorporated by reference in their entireties as if fully set forth herein.

TECHNICAL FIELD

The present invention relates to a wireless communication system, and more particularly, to a method of transmitting a signal in a wireless communication system and apparatus therefor.

BACKGROUND ART

A 3rd generation partnership project long term evolution (3GPP LTE) (hereinafter, referred to as 'LTE') communication system which is an example of a wireless communication system to which the present invention can be applied will be described in brief.

Figure 1:
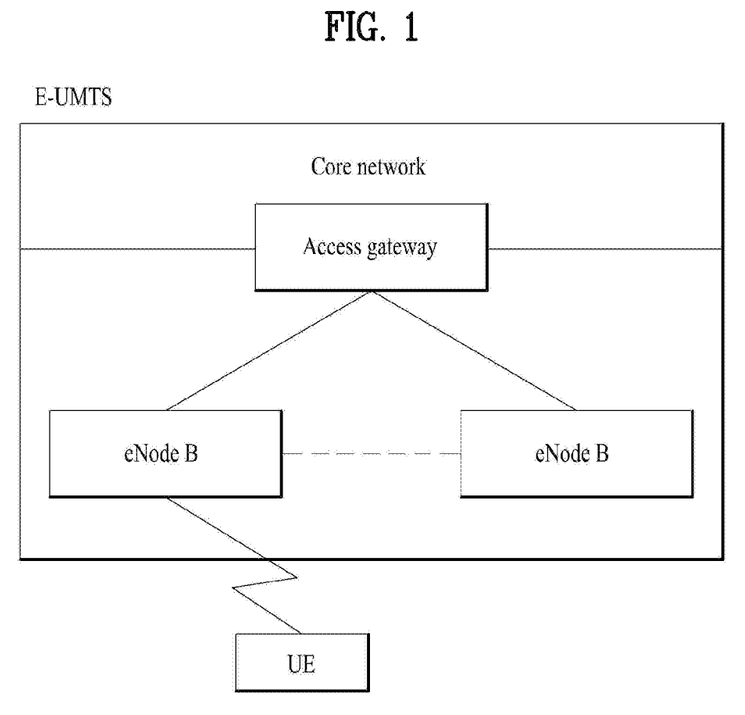
FIG. 1 schematically illustrates an E-UMTS network structure as an example of a wireless communication system.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.25, 2.5, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

DISCLOSURE OF THE INVENTION

Technical Task

Based on the aforementioned discussion, the technical task of the present invention is to propose a method of transmitting a signal in a wireless communication system and apparatus therefor.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In one technical aspect of the present invention, provided herein is a method of transmitting a signal by a user equipment in a wireless communication system supportive of Multiple Input Multiple Output (MIMO), the method including transmitting a scheduling request to a base station using a scheduling request beam resource and receiving a confirmation message in response to the scheduling request from the base station, wherein the confirmation message includes an indication determined according to the scheduling request beam resource and a best downlink beam configured in advance for the UE.

Preferably, the scheduling request beam resource may include a resource mapped to one of a multitude of downlink beams transmitted by the base station.

Preferably, the scheduling request may include at least one of a downlink beam change of the base station, a reference signal transmission request for measuring a downlink beam of the base station, and a resource allocation request for data transmission.

Preferably, if the scheduling request beam resource and the best downlink beam configured in advance for the user equipment are different from each other, the indication may indicate that it is changed into a downlink beam associated with the scheduling request beam resource by the base station. More preferably, the indication may indicate that the change into the downlink beam is scheduled to be executed after a prescribed time.

Preferably, if a scheduling request including a reference signal request is transmitted to the base station using a scheduling request beam resource different from the best downlink beam configured in advance for the user equipment, the confirmation message may indicate a change into a downlink beam associated with the scheduling request beam resource and a reference signal for the changed downlink beam.

Preferably, if a scheduling request including a resource allocation for data transmission is transmitted to the base station using a scheduling request beam resource different from the best downlink beam configured in advance for the user equipment, the confirmation message may indicate a change into a downlink beam associated with the scheduling request beam resource and the resource allocation for the data transmission for the changed downlink beam.

Preferably, the scheduling request beam resource may be associated with the best downlink beam configured in advance for the user equipment and the scheduling request may include index information for a beam change. More preferably, the index information may include an index difference between the best downlink beam and a beam to be changed.

Preferably, the scheduling request beam resource may be associated with the best downlink beam and at least one downlink beam adjacent to the best downlink beam. More preferably, the number of the at least one downlink beam adjacent to the best downlink beam may be indicated by the base station.

In another technical aspect of the present invention, provided herein is a user equipment in a wireless communication system supportive of Multiple Input Multiple Output (MIMO), the user equipment including a radio frequency unit and a processor configured to transmit a scheduling request to a base station using a scheduling request beam resource and receive a confirmation message in response to the scheduling request from the base station, wherein the confirmation message includes an indication determined according to the scheduling request beam resource and a best downlink beam configured in advance for the UE.

Advantageous Effects

According to an embodiment of the present invention, signal transmission can be efficiently performed in a wireless communication system.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR INVENTION

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). CDMA may be implemented by radio technology such as UTRA (universal terrestrial radio access) or CDMA2000. TDMA may be implemented by radio technology such as global system for mobile communications (GSM)/general packet radio service (GPRS)/enhanced data rates for GSM evolution (EDGE). OFDMA may be implemented by radio technology such as IEEE 802.11 (Wi-Fi), IEEE 802.16 (WiMAX), IEEE 802.20, and evolved UTRA (E-UTRA). UTRA is a part of a universal mobile telecommunications system (UMTS). 3rd generation partnership project long term evolution (3GPP LTE) is a part of evolved UMTS (E-UMTS) that uses E-UTRA, and adopts OFDMA in downlink and SC-FDMA in uplink. LTE-advanced (LTE-A) is an evolved version of 3GPP LTE.

For clarification of the description, although the following embodiments will be described based on 3GPP LTE/LTE-A, it is to be understood that the technical spirit of the present invention is not limited to 3GPP LTE/LTE-A. Also, specific terms hereinafter used in the embodiments of the present invention are provided to assist understanding of the present invention, and various modifications may be made to the specific terms within the range that they do not depart from the technical spirit of the present invention.

Figure 2:
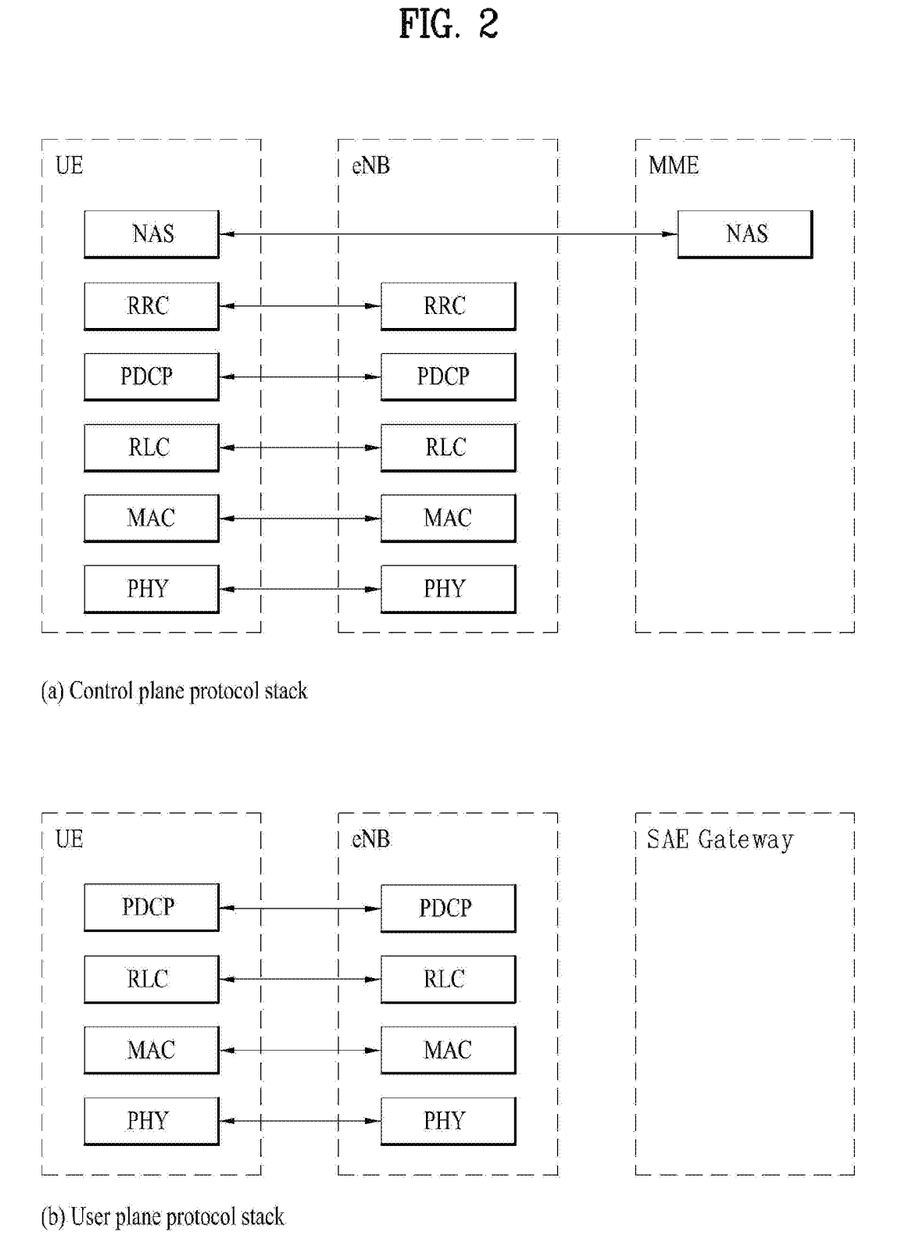
FIG. 2 illustrates control plane and user plane structures of a radio interface protocol between a UE and an E-UTRAN on the basis of the 3GPP wireless access network standard.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
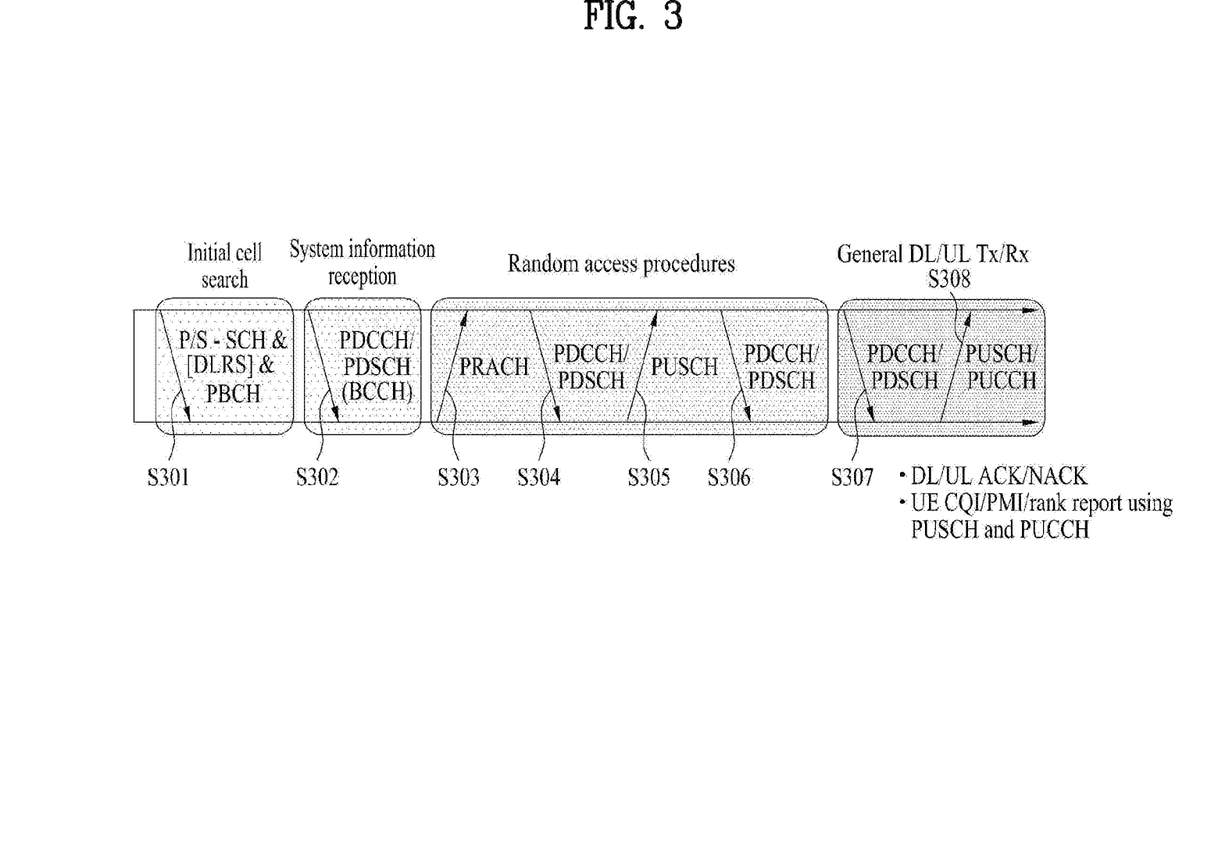
FIG. 3 illustrates physical channels used in a 3GPP system and a general signal transmission method using the same.

FIG. 3 illustrates physical channels used in a 3GPP system and a general method for transmitting a signal using the physical channels.

A user equipment (UE) performs initial cell search such as synchronizing with a base station when it newly enters a cell or the power is turned on (S301). To this end, the UE synchronizes with the base station by receiving a primary synchronization channel (P-SCH) and a secondary synchronization channel (S-SCH) from the base station, and acquires information such as cell ID, etc. Afterwards, the UE may acquire broadcast information within the cell by receiving a physical broadcast channel (PBCH) from the base station. Meanwhile, the UE may identify a downlink channel status by receiving a downlink reference signal (DL RS) at the initial cell search step.

The UE which has finished the initial cell search may acquire more detailed system information by receiving a physical downlink shared channel (PDSCH) in accordance with a physical downlink control channel (PDCCH) and information carried in the PDCCH (S302).

The UE may perform a random access procedure (RACH) to complete access to the base station when the UE initially accesses the BS or has no radio resources for signal transmission (S303 to S306). To this end, the UE may transmit a specific sequence through a preamble over a physical random access channel (PRACH) (S303 and S305) and may receive a response message to the preamble through the PDCCH and the PDSCH corresponding to the PDCCH (S304 and S306). In the case of a contention based RACH, the UE may additionally perform a contention resolution procedure.

Having performed the above described procedures, the UE may be able to perform a PDCCH/PDSCH reception (S307) and a PUSCH/PUCCH (physical uplink shared channel/physical uplink control channel) transmission (S308) as a general uplink/downlink signal transmission procedure. Particularly, the UE receives downlink control information (DCI) through the PDCCH. Here, DCI includes control information such as resource allocation information about the UE and has a format depending on purpose of use. Control information transmitted from the UE to the base station on uplink or transmitted from the base station to the UE includes a downlink/uplink ACK/NACK signal, a channel quality indicator (CQI), a precoding matrix index (PMI), a rank indicator (RI), etc. In 3GPP LTE, the UE can transmit the control information such as CQI/PMI/RI through a PUSCH and/or a PUCCH.

Figure 4:
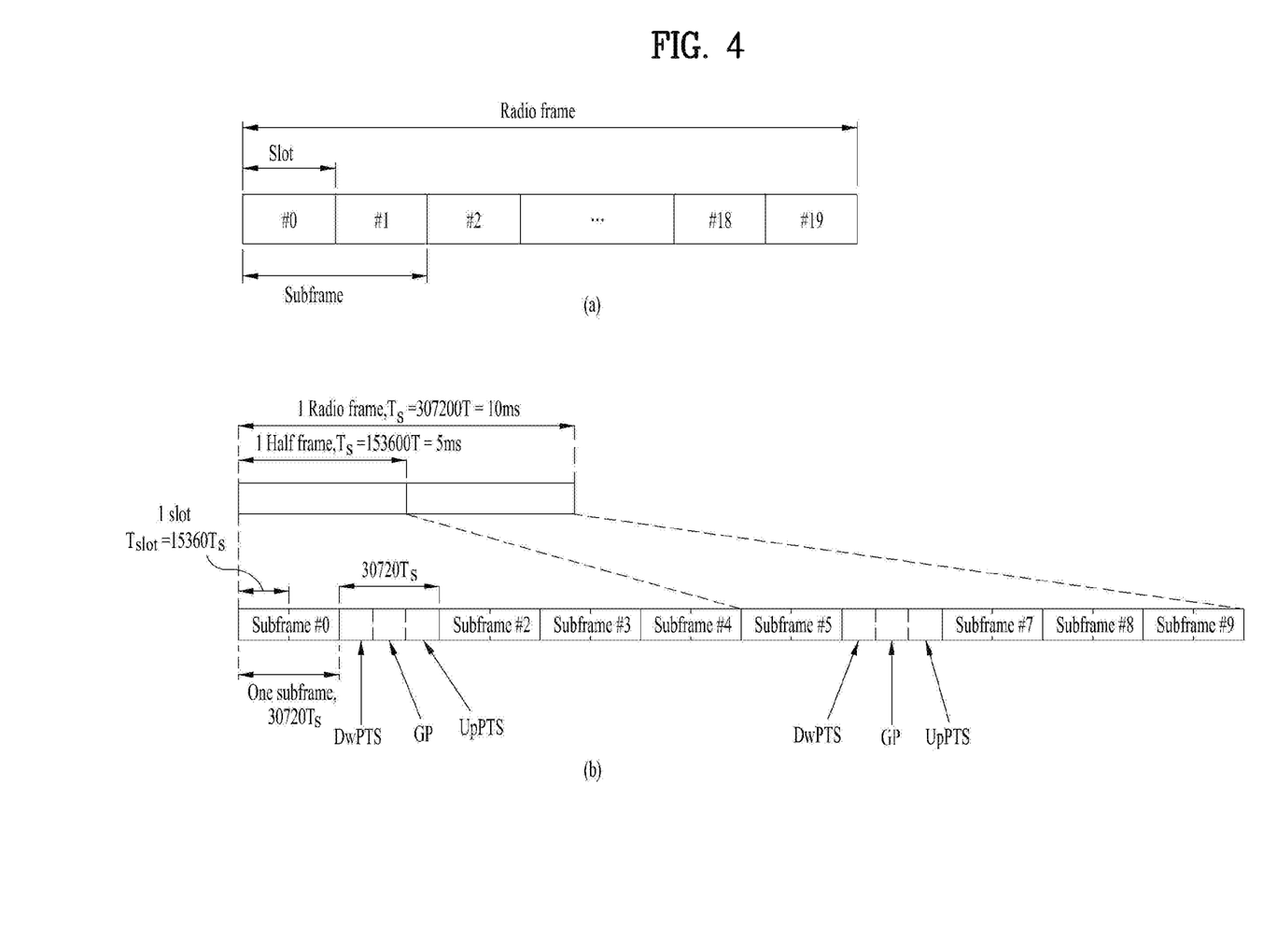
FIG. 4 illustrates a radio frame structure used for LTE.

FIG. 4 illustrates a structure of a radio frame used in LTE.

Referring to FIG. 4, in a cellular OFDM wireless packet communication system, transmission of an uplink/downlink data packet is performed on a subframe by subframe basis and one subframe is defined as a specific period including a plurality of OFDM symbols. 3GPP LTE standards support a type-1 radio frame structure applicable to FDD (Frequency Division Duplex) and a type-2 radio frame structure applicable to TDD (Time Division Duplex).

FIG. 4(a) illustrates the type-1 radio frame structure. A downlink radio frame includes 10 subframes, each of which includes two slots in the time domain. A time taken to transmit one subframe is called a TTI (transmission time interval). For example, one subframe may be 1 ms in length and one slot may be 0.5 ms in length. One slot includes a plurality of OFDM symbols in the time domain and a plurality of resource blocks (RBs) in the frequency domain. 3GPP LTE uses OFDMA on downlink and thus an OFDM symbol refers to one symbol period. An OFDM symbol may also be referred to as an SC-FDMA symbol or a symbol period. An RB as a resource allocation unit may include a plurality of consecutive subcarriers in one slot.

The number of OFDM symbols included in one slot may depend on a CP (Cyclic Prefix) configuration. The CP includes an extended CP and a normal CP. For example, when the OFDM symbol is configured according to the normal CP, the number of OFDM symbols included in one slot may be 7. When the OFDM symbol is configured according to the extended CP, the length of one OFDM symbol increases and thus the number of OFDM symbols included in one slot is less than that in the case of the normal CP. In the extended CP, for example, the number of OFDM symbols included in one slot can be 6. In the case of unstable channel state such as rapid movement of a UE at a high speed, the extended CP can be used to reduce inter-symbol interference.

When the normal CP is used, one slot includes 7 OFDM symbols and thus one subframe includes 14 OFDM symbols. Here, a maximum of three OFDM symbols located in a front portion of each subframe may be allocated to a PDCCH (Physical Downlink Control Channel) and the remaining symbols may be allocated to a PDSCH (Physical Downlink Shared Channel).

FIG. 4(b) illustrates the type-2 radio frame structure. The type-2 radio frame includes two half frames and each half frame is composed of four normal subframes each of which includes two slots and a special subframe including two slots, a DwPTS (Downlink Pilot Time Slot), a GP (Guard Period) and a UpPTS (Uplink Pilot Time Slot).

In the special subframe, the DwPTS is used for initial cell search, synchronization or channel estimation in a UE. The UpPTS is used for channel estimation and uplink transmission synchronization of a UE in a BS. That is, the DwPTS is used for downlink transmission and the UpPTS is used for uplink transmission. Particularly, the UpPTS is used for transmission of a PRACH preamble or SRS. The GP is used to eliminate interference generated on uplink due to multi-path delay of a downlink signal between uplink and downlink.

With respect to the special subframe, a configuration is currently defined in 3GPP standard document as shown in Table 1. Table 1 shows DwPTS and UpPTS when and the remaining period is set to a GP.

TABLE 1

| | | Normal cyclic prefix in downlink | | | Extended cyclic prefix in downlink | |
| --- | --- | --- | --- | --- | --- | --- |
| | | | UpPTS | | | UpPTS |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

The type-2 radio frame structure, that is, an uplink/downlink (UL/DL) configuration in a TDD system is shown in Table 2.

TABLE 2

| Uplink-downlink configuration | Downlink-to-Uplink Switch-point periodicity | Subframe number | | | | | | | | | |
| --- | --- | --- | --- | --- | --- | --- | --- | --- | --- | --- | --- |
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 2, D indicates a downlink subframe, U indicates an uplink subframe and S represents the special subframe. In addition, Table 2 shows downlink-to-uplink switching periodicity in a UL/DL subframe configuration in each system.

The aforementioned radio frame structure is merely an example and the number of subframes included in a radio frame, the number of slots included in a subframe and the number of symbols included in a slot may be varied.

Based on the above-described contents, operations related to a beam change request for New RAT technology are described in the present invention.

New RAT currently considers a fixed Random Access CHannel (RACH) resource periodically appearing for an RACH transmission. A UE transmits RACH on the RACH resource. In doing so, the RACH resource is separated into different resources respectively mapped to different downlink beams of a base station. Namely, the base station can receive a receiving (Rx) vector on each resource mapped to each downlink beam by precoding of forming the downlink beam of the base station. And, a UE can transmit information to the base station by performing a precoding with a receiving vector optimized for each downlink beam. According to the present invention, each of the above-described separated resources is named an RACH beam resource. It is currently discussed that a UE transmits RACH on an RACH beam resource mapped to a downlink beam determined as optimal for the UE itself. Thus, the RACH beam resource determined as optimal by the UE shall be named a best RACH beam resource.

Accordingly, in a way similar to RACH operation, it is able to consider transmitting a Scheduling Request (SR) on a best SR beam resource. RACH and ST may be used in a manner of sharing a resource by FDM.

In this case, in a way similar to the above-described RACH beam resource, it is able to define a fixed Scheduling Request (SR) resource periodically appearing for SR transmission. Here, the SR resource may be separated into different resources respectively mapped to different downlink beams of a base station. Namely, the base station can receive an Rx vector on each resource mapped to each downlink beam by precoding of forming the downlink beam of the base station. And, a UE can transmit information to the base station by performing a precoding with an Rx vector optimized for each downlink beam. Each of the above-described separated resources is defined as a scheduling request beam resource.

Regarding the separated SR beam resources, it is currently discussed that a UE transmits a scheduling request on an SR beam resource mapped to a downlink beam of a base station determined as optimal for the UE itself. Thus, the SR beam resource determined as optimal by the UE shall be named a best Scheduling Request (SR) beam resource.

In the present invention, the scheduling request may basically consider the three kinds of cases, i.e., requests A to C as follows.

Request A: The first is a request for changing a downlink beam of a base station.

Request B: The second is a request for transmitting a reference signal to measure a downlink beam of a base station.

Request C: The third is a request for performing resource allocation for data transmission.

When such a scheduling request is made, a UE may have a best downlink beam recently confirmed by a base station. After the confirmation, a downlink beam different from the best downlink beam may be optimal.

When a UE makes a scheduling request, and particularly, a request for changing a downlink beam of a base station, the scheduling request can be made on an SR beam resource mapped to a new best downlink beam according to a measurement result measured by the UE. In such a case, without a special process/procedure, the base station can directly give the UE the confirmation that a downlink beam is changed into a downlink beam desired by the UE. If so, unless a special situation, an operation of replacing a beam by a new downlink beam for the UE with a small delay is possible.

Yet, when such a beam change is requested, in case that a UE makes a request for a beam change on the basis of a measurement result each time a best downlink beam is changed, if the UE moves on an inter-beam boundary line, a beam change may continue to occur between two beams alternately. This may bring a resource waste systematically. Or, while a beam change procedure continues, as a signal transmission is not performed in the course of the change, a delay speed (i.e., latency) may increase. To prevent this, when a UE makes a beam change request, if a measurement result is equal to or smaller than a most recently confirmed best downlink beam by a predetermined threshold, it is preferable that a beam change request is not allowed.

Hereinafter, the contents of the present invention are described in detail.

First Embodiment

According to a first embodiment of the present invention, when a UE makes a request for replacement of a best downlink beam most recently confirmed by a base station, the UE can perform a transmission on an SR beam resource associated not with the best downlink beam most recently confirmed by the base station but with a downlink beam desiring a beam change on making a request (or a best downlink beam on making a request). In this case, the base station can directly confirm the beam change into a downlink beam desired by the UE without a separate feedback from the UE.

If a base station is performing a downlink transmission or a transmission is scheduled, the downlink transmission may be performed on the assumption of a best downlink beam most recently confirmed by the base station. After completion of the downlink transmission in progress or the downlink transmission scheduled to be performed, it can be confirmed that a current beam will be replaced by a beam desired by a UE. If this is further extended, it can be confirmed that a beam will be replaced after a predetermined time. And, such a predetermined time may be indicated on confirmation or defined in advance between transmission and reception.

Or, a base station may newly determine a downlink beam for a UE by receiving feedback of a beam relevant measurement result from the UE. Or, a base station may newly determine a downlink beam for a UE by separately transmitting a beam relevant reference signal to the UE and then receiving feedback of a measurement result of the beam relevant reference signal separately transmitted to the UE.

Such a measurement result may be regulated to be fed back only for a partially associated beam with reference to a beam currently desired to be changed by the UE.

Second Embodiment

If a UE desires the request B or the request C only, the UE can perform an operation based on the request B or the request C on an SR beam resource associated with a best downlink beam most recently confirmed by a base station. Yet, when the UE simultaneously desires an operation for the request A and an operation for the request B or simultaneously desires an operation based on the request A and an operation based on the request C, if the two operations are performed separately, it may be inefficient. Therefore, according to a second embodiment, when an operation based on the request A and an operation based on the request B are simultaneously desired or an operation based on the request A and an operation based on the request C are simultaneously desired, a method of operating it once is described.

In such a case, while performing an operation for the request B or the request C, a UE can perform a transmission on an SR beam resource associated not with a best downlink beam most recently confirmed by a base station but with a downlink beam desiring a beam change on making a request (or a best downlink beam on making a request). In doing so, although the UE does not make a request for a beam change specially, if the best downlink beam most recently confirmed for the UE and the downlink beam mapped to the SR beam resource used by the UE on making the scheduling request are different from each other, the base station may be configured to determine that the UE desires the beam change. In this case, the base station can directly confirm that the beam change into a downlink beam desired by the UE will be performed without a separate feedback from the UE.

If a base station is performing a downlink transmission or a transmission is scheduled, the downlink transmission may be performed on the assumption of a best downlink beam most recently confirmed by the base station. Thereafter, the base station may confirm that a current beam will be replaced by a beam desired by a UE. If this is further extended, it can be confirmed that a beam will be replaced after a predetermined time. And, such a predetermined time may be indicated on confirmation or defined in advance between transmission and reception.

Or, a base station may newly determine a downlink beam for a UE by receiving feedback of a beam relevant measurement result from the UE. Or, a base station may newly determine a downlink beam for a UE by separately transmitting a beam relevant reference signal to the UE and then receiving feedback of a measurement result of the signal from the UE.

Such a measurement result may be regulated to be fed back only for a partially associated beam with reference to a beam currently desired to be changed by the UE.

Third Embodiment

According to the present invention, when a UE desires to replace a best downlink beam most recently confirmed by a base station, the UE can perform a transmission not on a scheduling request resource associated with a downlink beam desired to be replaced but on a scheduling request resource associated with a best downlink beam confirmed by the base station. In doing so, information on the replacement desired downlink beam may be transmitted together with scheduling request information. The contents of the present invention are described in detail as follows.

When a UE makes a request for replacement of a best downlink beam most recently confirmed by a base station, the UE can transmit information not on the best downlink beam most recently confirmed by the base station but on a downlink beam desiring a beam change on making a request (or a best downlink beam on making a request) together with the request. Namely, if all beams are left as a set and indexes are transmitted, since an amount of the information may be large, the UE can transmit a value of a difference between an index of the best downlink beam most recently confirmed by the base station and an index of the downlink beam desiring the beam change on making the request (or the best downlink beam on making the request) together with the request. Such information on the beam change can distinguish that what kind of symbols are transmitted on transmitting the Scheduling Request (SR) with modulated symbols. In such a case, when a Scheduling Request (SR) is transmitted for channel measurement, a reference signal may be sent together. Or, for such distinguishment, information on a beam change may be mapped to a sequence of the SR.

In this case, the base station can directly confirm that the beam change into a downlink beam desired by the UE will be performed without a separate feedback from the UE.

If a base station is performing a downlink transmission or a transmission is scheduled, the downlink transmission may be performed on the assumption of a best downlink beam most recently confirmed by the base station. Thereafter, it can be confirmed that a current beam will be replaced by a beam desired by a UE. If this is further extended, it can be confirmed that a beam will be replaced after a predetermined time. And, such a predetermined time may be indicated on confirmation or defined in advance between transmission and reception.

Or, a base station may newly determine a downlink beam for a UE by receiving feedback of a beam relevant measurement result from the UE. Or, a base station may newly determine a downlink beam for a UE by separately transmitting a beam relevant reference signal to the UE and then receiving feedback of a measurement result of the signal from the UE.

Such a measurement result may be regulated to be fed back only for a partially associated beam with reference to a beam currently desired to be changed by the UE.

Fourth Embodiment

According to a fourth embodiment, a part of UE-specifically configuring a Scheduling Request (SR) beam resource is described as follows.

Since a cell UE-commonly operates an SR beam resource for an overall operation in the aforementioned first to third embodiments, a delay is generated in the course of an operation of a base station in response to a scheduling request. As a UE uses an SR beam resource defined in common, when an SR beam resource appropriate for the UE appears, the UE makes a scheduling request, whereby a delay may be generated. To prevent such a delay, it is able to consider a method for a base station to allocate an SR beam resource UE-specifically.

In case of allocating a resource UE-specifically, in order to reduce a delay, a base station does not configure an SR beam resource for all downlink beams for each UE but is able to configure an SR beam resource mapped to a partial beam neighboring to a downlink beam most recently confirmed for a UE by the base station. Here, the partial beam may be defined as a beam index associated with a confirmed downlink beam. For example, when there are 3 indexes of a confirmed downlink beam, it is able to configure an SR beam resource for 5 downlink beams by making an SR beam resource associated with 4 neighboring downlink beam indexes.

Regarding such a configuration, the total number of SR beam resources is defined as N, a base station sets N or uses a pre-defined value, and a pattern form downlink beam indexes associated with a best downlink beam index most recently confirmed by the base station is defined and used. Such a value and pattern of N may be defined in advance or semi-statically configured for a UE through higher layer signaling such as RRC signaling.

Or, a base station may design a UE-specific SR beam resource not related to a beam. On the UE-specific SR beam resource, a UE repeatedly transmits a Scheduling Request (SR) so as to enable the base station to check what is an optimal downlink beam for each of the repeated scheduling requests.

Figure 5:
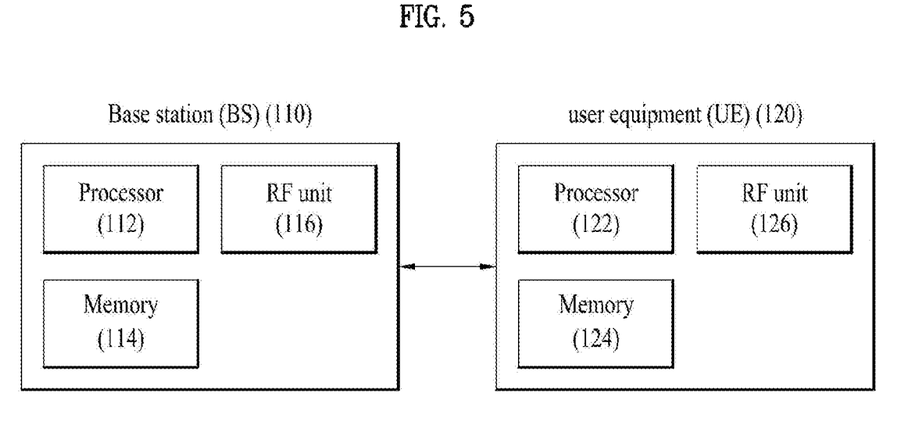
FIG. 5 illustrates a base station and a UE to which the present invention is applicable.

FIG. 5 illustrates a base station (BS) and a UE applicable to an embodiment of the present invention.

When a wireless communication system includes a relay, communication is performed between a BS and the relay on a backhaul link and communication is performed between the relay and a UE on an access link. Accordingly, the BS or UE shown in the figure may be replaced by the relay as necessary.

Referring to FIG. 5, a wireless communication system includes a BS 110 and a UE 120. The BS 110 includes a processor 112, a memory 114 and a radio frequency (RF) unit 116. The processor 112 may be configured to implement the procedures and/or methods proposed by the present invention. The memory 114 is connected to the processor 112 and stores various types of information related to operations of the processor 112. The RF unit 116 is connected to the processor 112 and transmits and/or receives radio signals. The UE 120 includes a processor 122, a memory 124 and a radio frequency (RF) unit 126. The processor 122 may be configured to implement the procedures and/or methods proposed by the present invention. The memory 124 is connected to the processor 122 and stores various types of information related to operations of the processor 122. The RF unit 126 is connected to the processor 122 and transmits and/or receives radio signals. The BS 110 and/or the UE 120 may include a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

A specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the term, fixed station, Node B, eNode B (eNB), access point, etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor.

The memory unit may be located at the interior or exterior of the processor and may transmit data to and receive data from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

As mentioned in the foregoing description, a method of transmitting a signal in a wireless communication system and apparatus therefor are applicable to various wireless communication systems.

What is claimed is:

1. A method of transmitting a signal by a user equipment (UE) in a wireless communication system supporting Multiple Input Multiple Output (MIMO), the method comprising:
    transmitting a scheduling request to a base station using a scheduling request beam resource associated with a best downlink beam configured for the UE; and
    receiving a confirmation message in response to the scheduling request from the base station,
    wherein the confirmation message includes an indication determined according to the scheduling request beam resource and the best downlink beam configured for the UE, and
    wherein the scheduling request includes index information including an index difference between the best downlink beam and a beam to be changed.

2. The method of claim 1, wherein the scheduling request beam resource comprises a resource mapped to one of a plurality of downlink beams transmitted by the base station.

3. The method of claim 1, wherein the scheduling request comprises at least one of a downlink beam change for the base station, a reference signal transmission request for measuring a downlink beam of the base station, and a resource allocation request for data transmission.

4. The method of claim 1, wherein when the scheduling request beam resource and the best downlink beam configured for the UE are different from each other, the indication indicates that the downlink beam is changed to a downlink beam associated with the scheduling request beam resource by the base station.

5. The method of claim 4, wherein the indication indicates that the downlink beam is changed to the downlink beam associated with the scheduling request beam resource is scheduled to be executed after a prescribed time.

6. The method of claim 1, wherein when a scheduling request including a reference signal request is transmitted to the base station using a scheduling request beam resource different from the best downlink beam configured for the UE, the indication in the confirmation message indicates a change to a downlink beam associated with the scheduling request beam resource and a reference signal for the downlink beam to be changed.

7. The method of claim 1, wherein when a scheduling request including a resource allocation for data transmission is transmitted to the base station using a scheduling request beam resource different from the best downlink beam configured for the UE, the indication in the confirmation message indicates a change to a downlink beam associated with the scheduling request beam resource and the resource allocation for the data transmission for the downlink beam to be changed.

8. The method of claim 1, wherein the scheduling request beam resource is associated with the best downlink beam and at least one downlink beam adjacent to the best downlink beam.

9. The method of claim 8, wherein the number of the at least one downlink beam adjacent to the best downlink beam is indicated by the base station.

10. A user equipment (UE) in a wireless communication system supporting Multiple Input Multiple Output (MIMO), the UE comprising:
    a radio frequency unit; and
    a processor configured to transmit a scheduling request to a base station using a scheduling request beam resource associated with a best downlink beam configured for the UE, and receive a confirmation message in response to the scheduling request from the base station,
    wherein the confirmation message includes an indication determined according to the scheduling request beam resource and the best downlink beam configured for the UE, and
    wherein the scheduling request includes index information including an index difference between the best downlink beam and a beam to be changed.

* * * * *